US006216264B1

United States Patent
Maze et al.

(10) Patent No.: US 6,216,264 B1
(45) Date of Patent: *Apr. 10, 2001

(54) SCHEDULER APPARATUS EMPLOYING A GOPHER AGENT

(75) Inventors: Kenneth Wayne Maze; Jeffrey Philip Reavis, both of Indianapolis; Robert Howard Miller; Sheila Renee Crosby, both of Carmel; Keith Reynolds Wehmeyer, Fishers; Hugh Boyd Morrison, Indianapolis; Megan Louise Brown, Carmel, all of IN (US)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,285

(22) Filed: Jul. 25, 1996

Related U.S. Application Data

(60) Provisional application No. 60/006,889, filed on Nov. 17, 1995.

(51) Int. Cl.[7] ....................................................... H04N 7/10
(52) U.S. Cl. ................................. 725/53; 725/52; 345/327
(58) Field of Search ..................................... 348/563, 564, 348/565, 569, 570, 906, 10, 7, 1, 734; 358/86, 142; 345/327; 725/53, 52

(56) References Cited

U.S. PATENT DOCUMENTS

| | | | |
|---|---|---|---|
| 4,706,121 | * 11/1987 | Young | 358/142 |
| 5,323,240 | 6/1994 | Amano et al. | 348/731 |
| 5,585,838 | * 12/1996 | Lawler et al. | 348/13 |
| 5,629,733 | * 5/1997 | Youman et al. | 348/7 |
| 5,635,989 | * 6/1997 | Rothmuller | 348/563 |
| 5,649,186 | * 7/1997 | Ferguson | 707/10 |
| 5,686,954 | * 11/1997 | Yoshinobu et al. | 348/13 |

FOREIGN PATENT DOCUMENTS

| | | | |
|---|---|---|---|
| WO93/22877 | 11/1993 | (WO) | H04N/7/173 |
| WO94/14282 | 6/1994 | (WO) | H04N/7/16 |

OTHER PUBLICATIONS

Proceedings From Eleven Technical Sessions Jun. 6–9, 1993 Rutkowski—NCTA Technical Papers–Cover page + pp. 223–236.

Craig Danuloff, "The System 7 Book", 1991, pp. 102–113, published by Ventana Press, Inc.

European Patent Application No. 95107039.0 filed Oct. 5, 1995 Publication No. 0682452A2, Nov. 15, 1995.*

Alan Simpson, "Mastering WordPerfect 5.1 & 5.2 Windows". Sybex Inc. 1993.*

* cited by examiner

*Primary Examiner*—Thomas G. Black
*Assistant Examiner*—Uyen Le
(74) *Attorney, Agent, or Firm*—Joseph S. Tripoli; Frank Y. Liao

(57) ABSTRACT

In a television system in which at least program title information for programs which are to be transmitted in the future is transmitted in advance to form a channel guide listing, apparatus is provided for searching the listing for specific user-entered information, and upon successful conclusion to the search, the apparatus schedules the tuning of the desired program, or in the alternative, notifies the viewer of the availability of the program. In those instances where descriptive text accompanies the program listing, apparatus of the invention performs a search of the text for a particular text string which may relate to the title, the star, the director, or the context of the program, among other search criteria.

13 Claims, 8 Drawing Sheets

| CH 150 | PROGRAM GUIDE | | | 7:05pm |
|---|---|---|---|---|
| | 7:00pm | 7:30pm | 8:00pm | 8:30pm |
| HBO 102 | OTHER PEOPLE'S MONEY | | FREE PREVIEW | DREAM ON |
| CBS 106 | EVENING NEWS | HOME IMPROVEMENT | BROOKLYN BRIDGE | RAVEN |
| UPN 113 | STAR TREK: VOYAGER | | ENTERTAINMENT TONIGHT | WORLD NEWS |
| CINE 210 | EYEWITNESS | FUN CITY | | DOUBLE TROUBLE |
| CNN 305 | PRIME NEWS | BOTH SIDES | RELIABLE SOURCES | HOME AND GARDEN |
| USA 422 | COUNTER STRIKE | | QUANTUM LEAP | |
| MORE | MOVIES | SPORTS | OTHER | ALL | EXIT |
| ENTER ALL OR PART OF PROGRAM NAME TO SEARCH: HOME | | | | |

FIG. 1a

| CH 150 | | PROGRAM GUIDE | | 7:05pm |
|---|---|---|---|---|
| | 7:00pm | 7:30pm | 8:00pm | 8:30pm |
| HBO 102 | OTHER PEOPLE'S MONEY | | FREE PREVIEW | DREAM ON |
| CBS 106 | EVENING NEWS | HOME IMPROVEMENT | BROOKLYN BRIDGE | RAVEN |
| UPN 113 | STAR TREK: VOYAGER | | ENTERTAINMENT TONIGHT | WORLD NEWS |
| CINE 210 | EYEWITNESS | FUN CITY | | DOUBLE TROUBLE |
| CNN 305 | PRIME NEWS | BOTH SIDES | RELIABLE SOURCES | HOME AND GARDEN |
| USA 422 | COUNTER STRIKE | | QUANTUM LEAP | |
| MORE | MOVIES | SPORTS | OTHER | ALL | EXIT |
| HOME FOUND: PRESS MENU AGAIN TO FIND ANOTHER OCCURRENCE | | | | |

FIG. 1b

| CH 150 | | PROGRAM GUIDE | | 7:05pm |
|---|---|---|---|---|
| | 7:00pm | 7:30pm | 8:00pm | 8:30pm |
| HBO 102 | OTHER PEOPLE'S MONEY | | FREE PREVIEW | DREAM ON |
| CBS 106 | EVENING NEWS | HOME IMPROVEMENT | BROOKLYN BRIDGE | RAVEN |
| UPN 113 | STAR TREK: VOYAGER | | ENTERTAINMENT TONIGHT | WORLD NEWS |
| CINE 210 | EYEWITNESS | FUN CITY | | DOUBLE TROUBLE |
| CNN 305 | PRIME NEWS | BOTH SIDES | RELIABLE SOURCES | HOME AND GARDEN |
| USA 422 | COUNTER STRIKE | | QUANTUM LEAP | |
| MORE | MOVIES | SPORTS | OTHER | ALL | EXIT |
| HOME FOUND: PRESS MENU AGAIN TO FIND ANOTHER OCCURRENCE |||||

FIG. 1c

| CH 150 | PROGRAM GUIDE | | | 7:05pm | |
|---|---|---|---|---|---|
| | 7:00pm | | | | |
| HBO 102 | OTHER PEOPLE'S MON | | | | |
| CBS 106 | EVENING NEWS | FRA TUR | | | |
| UPN 113 | STAR TREK: VOYA | | | | |
| CINE 210 | CINE SATURDAY NIGHT MOVIE: ZULU | | | | |
| CNN 305 | PRIME NEWS | BOTH SIDES | RELIABLE SOURCES | WORLD NEWS | |
| USA 422 | COUNTER STRIKE | | QUANTUM LEAP | | |
| MORE | MOVIES | SPORTS | OTHER | ALL | EXIT |

Popup (310, 320):

MOVIE TITLE: ZULU
STARRING: STANLEY BAKER & MICHAEL CAINE
PRODUCER: STANLEY BAKER
RATING: PG-13 (VIOLENCE)
REVIEW: ☆☆☆ 1/2
PLOT: A VASTLY OUTNUMBERED COMPANY OF BRITISH SOLDIERS IN LATE 19TH CENTURY SOUTH AFRICA DEFENDS AN ISOLATED OUTPOST AGAINST AN ATTACK BY 40,000 ZULU WARRIORS.

FIG. 3

| TITLE | TOPIC | THEME | KEYWORD | ACTION | TIME |
|---|---|---|---|---|---|
| STAR TREK | | | | REMIND | ALWAYS |
| THE SHINING | | | | RECORD | ALWAYS |
| | MOVIE | DRAMA | | REPORT | NOW |
| | | | ROBOT | REMIND | ALWAYS |
| | | | | | |

SCHEDULER APPARATUS EMPLOYING A GOPHER AGENT

The subject non-provisional application claims priority from a copending provisional application bearing attorney docket number RCA 87833, Ser. No. 60/006,889 filed Nov. 17, 1995.

FIELD OF THE INVENTION

The subject invention concerns apparatus for scheduling the selection of a television program for watching or recording at some future date.

BACKGROUND OF THE INVENTION

The programming of modern television systems, such as TV schedulers, VCRs, and Satellite Receivers has become more complicated in that the number of available channels has increased dramatically of late. For example RCA® DSS® direct broadcast satellite receivers provide as many as 150 channels to choose from. Heretofore, a user who wanted to record a specific non-regularly scheduled television program such as the airing of a particular movie, would regularly consult a television schedule printed in his local newspaper in the hope that he would eventually find that movie listed.

Such a practice may work well when there are only a few television channel schedules to examine, however, it is unlikely that a viewer would be able to examine the complete schedules for 150 television channels each week. Such a task would be daunting even if all of the movies were to be listed separately, as some television program listings do. Consequently, it is felt that as the number of channels increases, the chances of successfully locating a single occurrence of a program (like a needle in a haystack) becomes more and more unlikely.

SUMMARY OF THE INVENTION

In a television system in which at least program title information for programs which are to be transmitted in the future is transmitted in advance to form a channel guide listing, apparatus is provided for searching the listing for specific user-entered information, and upon successful conclusion to the search, the apparatus schedules the tuning of the desired program, or in the alternative, notifies the viewer of the availability of the program. In those instances where descriptive text accompanies the program listing, apparatus of the invention performs a search of the text for a particular text string which may relate to the title, the star, the director, or the context of the program, among other search criteria.

BRIEF DESCRIPTION OF THE DRAWING

FIGS. 1a–1c are illustrations of a screen display of a portion of a channel guide, in accordance with one aspect of the invention.

FIG. 3 is an illustration of a screen display of a portion of a channel guide showing auxiliary program information.

DETAILED DESCRIPTION OF THE INVENTION

Television systems such as the RCA® DSS® direct broadcast satellite system and Starsight® transmit channel guides for display on the television receivers of subscribers.

FIGS. 1a–1c show Program Guide screen displays produced, for example, by an RCA® DSS® direct broadcast satellite receiver system, manufactured by Thomson Consumer Electronics, Inc. Indianapolis, Ind. A user selects a television program from a Program Guide for viewing, by moving a cursor (via operation of remote control up, down, right, and left, direction control keys, not shown) to a block of the program guide screen display which contains the name of the desired program. When a SELECT key on the remote control is pressed, the current x and y position of the cursor is evaluated to derive virtual channel and program time information. In this example of FIG. 1a, a particular television show, EVENING NEWS has been highlighted for selection by use of the cursor keys on a remote control unit (e. g., 450R of FIG. 4). The highlighting is illustrated by the dark box outlining the title in FIGS. 1a–1c. Normally, upon pressing the SELECT key, the relevant programming data is transferred to a programming unit.

However, note the phrase "ENTER ALL OR PART OF A PROGRAM NAME TO SEARCH" which appears at the bottom of FIG. 1a. In this case the word "HOME" has been entered by a user. Upon pressing the MENU key, a search of the channel guide information is performed for the next occurrence of a television program including the word "HOME" in its title. At the completion of the search, the screen display of FIG. 1b is generated. Note that a television program on channel 106 entitled "HOME IMPROVEMENT" is now highlighted. If desired, a further search can be initiated by pressing the MENU key again. The result of that further search is shown in the screen display of FIG. 1c. Note that in FIG. 1c, a television program on channel 305, "HOME AND GARDEN" is highlighted, because that title includes the word "HOME", and thus satisfies the search criteria. The subject apparatus can also perform "substring searching" wherein the keyword (search term) is contained within another word. For example, a substring search on the word HOME would find the movie title "HOMEWARD BOUND". Similarly, the search can be made case sensitive, or case insensitive, as desired.

Figure 2:
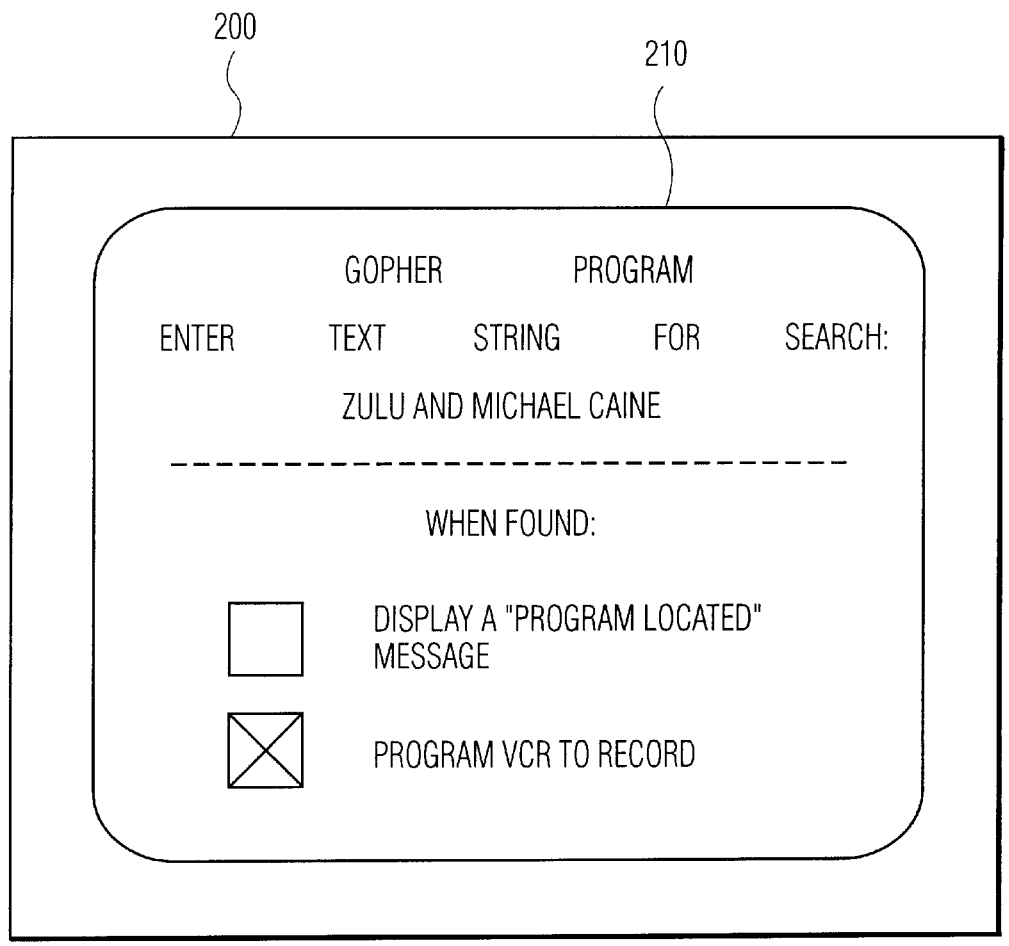
FIG. 2 is an illustration of a screen display showing a search request screen in accordance with another aspect of the invention.

FIG. 2 shows a "GOPHER PROGRAM" screen display 210 useful for entering text to be searched, and for entering instructions to be executed in the event that the search is terminated. The search entered on screen display 210 will perform the logical "AND" function on the search terms "ZULU" (a movie title) and "MICHAEL CAINE" (one of ZULU'S stars). While a logical "AND" function is shown, logical "OR" and "NOT" functions are also envisioned. In fact, a logical "OR" function could simply be performed by entering the search terms as two different searches. That is, if the search term "ZULU" were entered by itself, the movie "ZULU" AND any television program concerning the ZULU tribe would be selected. If the search term "MICHAEL CAINE" were entered as a separate search, the movie "ZULU" and any other movie starring Michael Caine would be selected.

Note from screen display 210, that when the movie "ZULU" is found, it is to be recorded. That is, after entering the search terms and instructions via screen display 210, the user does not have to perform any further function (other than ensuring that the VCR has a tape in it) to secure a recording of the movie "ZULU" whenever it is aired. At the proper time the apparatus of the invention will transmit the record commands to the VCR, automatically. Alternatively, the user may have checked the box labelled DISPLAY A "PROGRAM LOCATED" MESSAGE, in which case the show will not be recorded, but rather a reminder will be displayed indicating that the search has successfully terminated upon finding the requested item.

FIG. 3 shows a Program Guide screen 310, including an auxiliary information display 320. The text of auxiliary display 320 includes the search terms "ZULU" and "MICHAEL CAINE" in the program description. This text will be searched by the GOPHER PROGRAM and the search will come to a successful conclusion. Note that a search of "ZULU" and "STANLEY BAKER" would have been equally successful. It is important to note that not only is the Program Guide text, but also the auxiliary information associated with the television programs, is being searched.

Figures 4, 5:
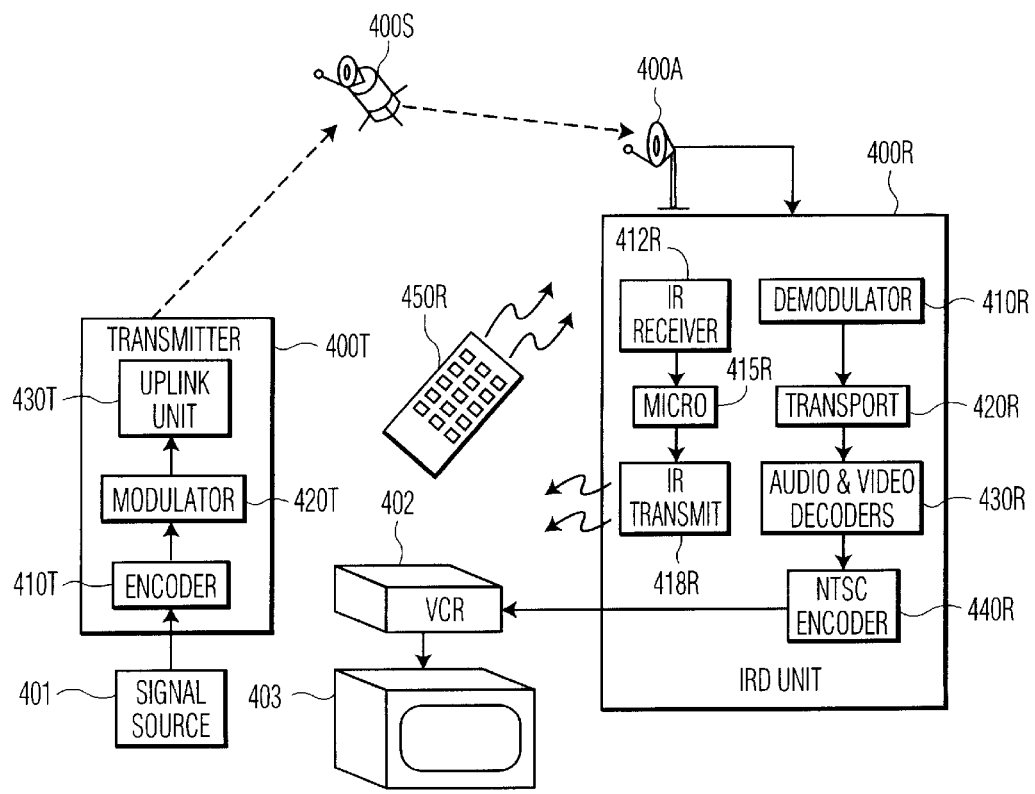
FIG. 4 is an illustration in block diagram form of apparatus suitable for use with the invention.
FIG. 5 is an illustration of a search request list in accordance with the subject invention.

As noted above, the channel guide data used by the controller of the subject apparatus to form the above-described interactive or confirmation sentences may be received from a satellite television communication system. FIG. 4 shows such a satellite television communication system in which, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence.

In such a satellite system, the information necessary to select a given television program is not fixedly-programmed into each receiver but rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because the receiver (IRD, or Integrated Receiver Decoder) literally does not know where any channel is located, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which: encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412R for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Microprocessor 415R also receives and interprets cursor key X and Y information in order to control the highlighting of user choices in the on-screen displays. Same prior art used on U.S. Pat. No. 5,682,206.

FIG. 5 shows a search request list which may be displayed as a screen display. In this embodiment of the invention, three actions are possible. First, as noted above, a show may be programmed to be recorded at its next airing without further intervention by the user. Second, as noted above, a reminder can be displayed on-screen that the desired program has been found. Third, a report listing various programs meeting the search criteria and airing in the immediate future (for example, the next three hours) can be prepared and displayed. In the example of FIG. 5, the user has requested that he be reminded anytime an episode of Star Trek appears in the Program Guide. The user has also requested that the movie "The Shining" be recorded the next time it is found in the guide. The user has also requested that he be reminded anytime the word "robot" appears in the guide or in the program descriptions of the guide. These instructions will run until turned off by the user. The remaining search (i.e., movie, drama, now) is a request which indicates that the user wants to know which dramas are being aired in the immediate future (i.e., within the next three hours). The controller will prepare a report listing all dramatic movies on all channels which are being broadcast in the next few hours. After doing so, this entry will be automatically deleted. It is further envisioned that a user may review and edit or delete search terms in order to modify on-going searches.

Figure 6:
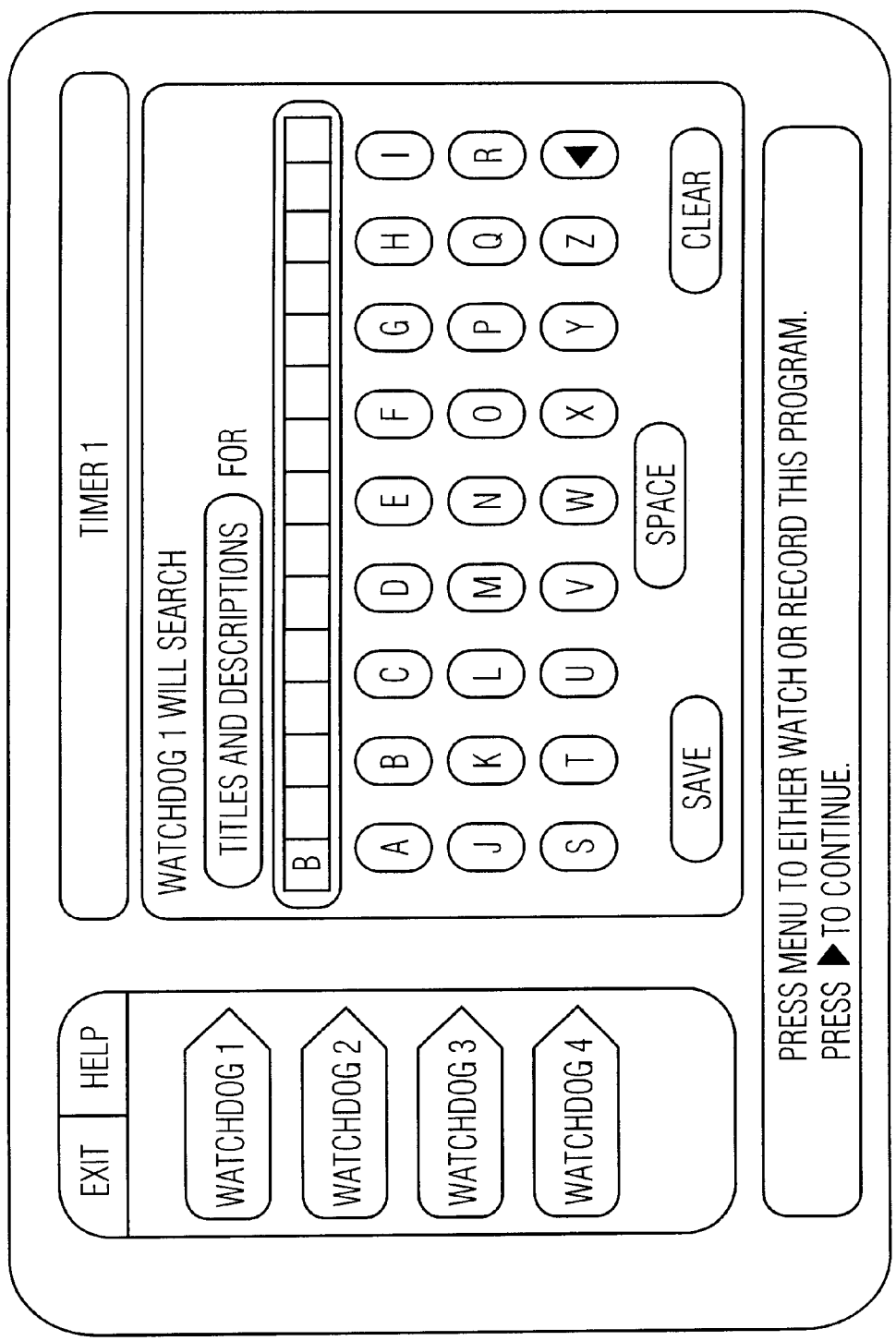
FIG. 6 is an illustration of a screen display useful for entering text search phrases in accordance with the invention.

FIG. 6 shows a screen display of a "virtual keyboard" useful for entering search data. Four "Search Gophers" called "Watchdogs" are programmable for performing simultaneous searches of the Program Guide and auxiliary information data streams. By using the CURSOR and SELECT keys, a user can "press" one of the watchdog buttons on the left of the screen to select it. He may then use the alphabet keys to enter his search request. (While not explicitly shown, alphanumeric keys are also envisioned). When the user is satisfied with the text of his search request, he may press the Save key to save the search terms for this watchdog search process. If he makes an error, he may delete the error with the CLEAR key.

Figure 7:
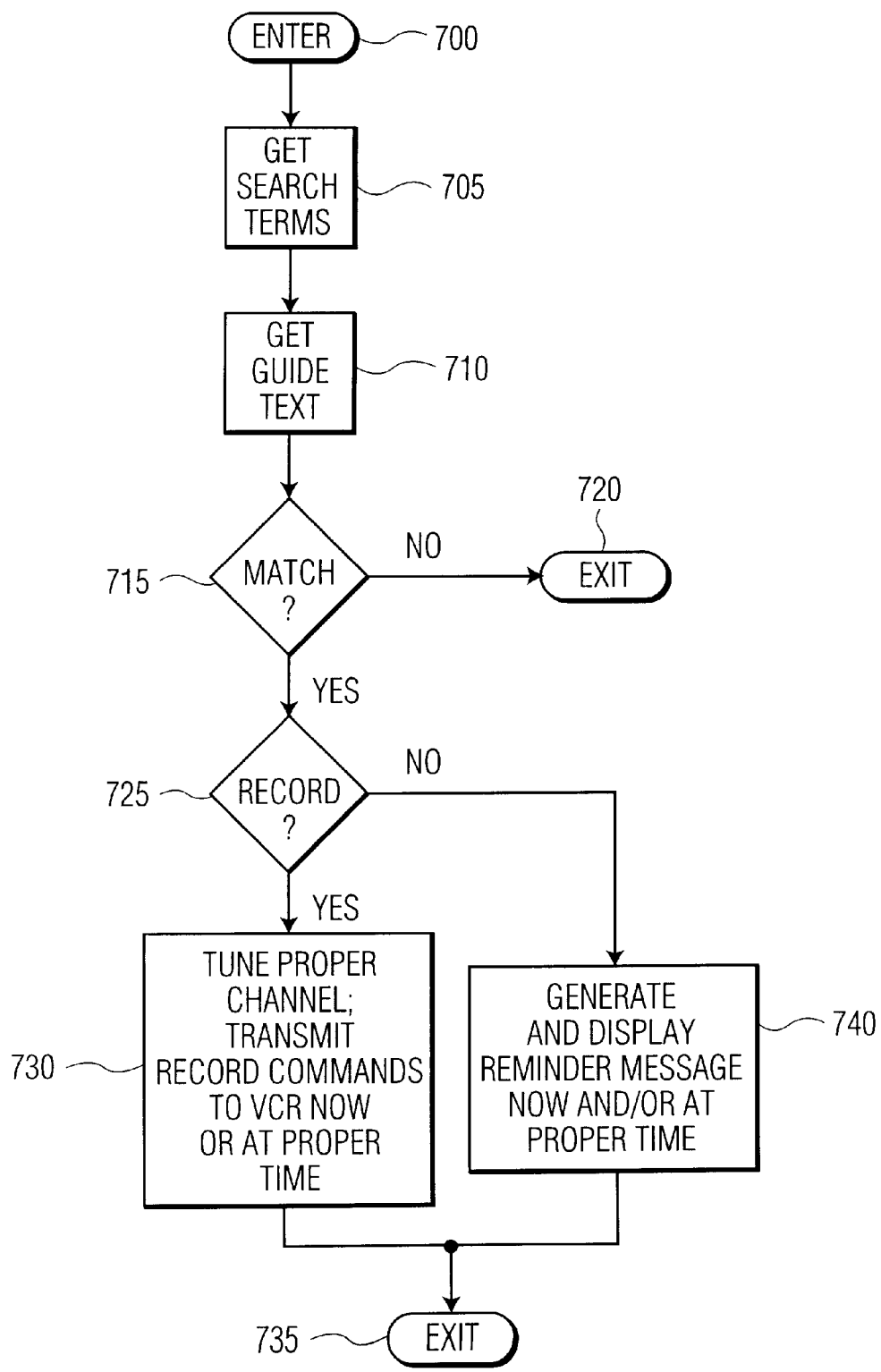
FIG. 7 is a flowchart useful in understanding the invention.

The Gopher program is entered at step 700 of FIG. 7. At step 705, the search terms are retrieved. At step 710, the Program Guide data is acquired. At step 715 a comparison is made to see if a match exists. If not the program is exited at step 720. If a match does exist, then the user-entered instructions are retrieved. A check is made at step 725 to determine if a record instruction has been entered, if so the routine advances to step 730 at which the record commands are transmitted to the VCR either immediately or at an appropriate later time. The routine is then exited at step 735. If however, a record instruction was not entered then the routine advances to step 740 at which a reminder message is generated for display, either immediately or at an appropriate later time as a "last minute reminder" before the desired show is broadcast, or both. The routine is then exited at step 735.

Although the invention was described with reference to a satellite television system, it is equally applicable to ground based television broadcast systems, both digital and analog.

We claim:

1. In a video apparatus in which channel guide information for programs is processed to form a channel guide, a method of searching and displaying one or more programs comprising:

displaying said channel guide in a grid format comprising channel information on one axis and time information on another axis, each grid in said format representing a respective program to be shown on a respective channel and a respective time period as indicated by said respective axes;

entering a search criteria;

performing a search of said channel guide information for a first program that satisfies said entered search criteria;

highlighting said first program in said channel guide having said grid format; and highlighting, in response to a subsequent user entry, a second program that satisfies said entered search criteria in said channel guide having said grid format, wherein said second program always appears at a position which is one of later in time than the first program, and in a subsequent channel to that of the first program.

2. The method of claim 1, wherein said entered search criteria may relate to title, star, director, topic, theme, or context of a program.

3. The method of claim 1 wherein said method further comprising the step of displaying said user entered search criteria concurrently with said channel guide.

4. The method of claim 1 wherein said method further comprising the step of selecting a user instruction for execution after successful completion of said search.

5. The method of claim 4 wherein said user instruction is to record said first program.

6. In a video apparatus in which channel guide information for programs is processed to form a channel guide, apparatus comprising:

control means for displaying said channel guide in a grid format comprising channel information on one axis and time information on another axis, each grid in said format representing a respective program to be shown on a respective channel and a respective time period as indicated by said respective axes;

data entry means for entering a search criteria;

said control means, in response to said entered search criteria, performs a search of said channel guide information for a first program that satisfies said entered search criteria; said control means highlights said first program in said channel guide having said grid format; and highlights, in response to a subsequent user entry, a second program that satisfies said entered search criteria in said channel guide having said grid format, wherein said second program always appears at a position which is one of later in time than the first program, and in a subsequent channel to that of the first program.

7. The apparatus of claim 6, wherein said search criteria may relate to title, star, director, topic, theme, or context of a program.

8. The apparatus of claim 6 wherein said user entered search criteria is displayed concurrently with said channel guide.

9. The apparatus of claim 6 wherein the second program is latter in time than the first program.

10. The apparatus of claim 6 wherein a user may select a user instruction for execution by said control means after successful completion of said search.

11. The apparatus of claim 10 wherein said user instruction is to record said first program.

12. The apparatus of claim 10 wherein said user instruction is to notify a user of an availability of said first program.

13. The apparatus of claim 6 wherein, said user-entered criteria is entered by means of a screen displayed keyboard operated by selecting keys of said data entry means.

* * * * *